United States Patent [19]

Fischer

[11] Patent Number: 5,309,495
[45] Date of Patent: May 3, 1994

[54] POSITIONING DEVICE FOR AN X-RAY THICKNESS MEASURING SYSTEM

[76] Inventor: Helmut Fischer, 7032 Sindelfingen 6, Industriestr. 21, Fed. Rep. of Germany

[21] Appl. No.: 853,492
[22] Filed: Mar. 18, 1992
[51] Int. Cl.⁵ .............................................. G01B 15/02
[52] U.S. Cl. ...................... 378/89; 378/206; 378/208
[58] Field of Search .................. 378/89, 50, 147, 206, 378/14 R, 160, 208

[56] References Cited

U.S. PATENT DOCUMENTS

| | | | |
|---|---|---|---|
| 4,534,049 | 8/1985 | Koga | 378/89 |
| 4,648,107 | 3/1987 | Latter | 378/50 |
| 4,799,246 | 1/1989 | Fischer | 378/50 |
| 4,860,329 | 8/1989 | Weiser et al. | 378/50 |

Primary Examiner—David P. Porta
Assistant Examiner—Kim-Kwok Chu

[57] ABSTRACT

In x-ray fluorescence systems, the screening prevents the bringing of the measurement spot into the correct position in relation to the x-ray beam using the naked eye. The use of a television camera with a screen as well as illuminating devices makes the measuring system expensive and complicates the use of the system. According to the invention, this is avoided in that use is made of an illuminated device, which operates using an optical system and which reproduces, by convergent light beams at their intersection, the correct height position, lateral position and forward/rearward position of the measurement object when the tray carrying the measurement object has been moved to a forward position away from the x-ray beam.

13 Claims, 5 Drawing Sheets

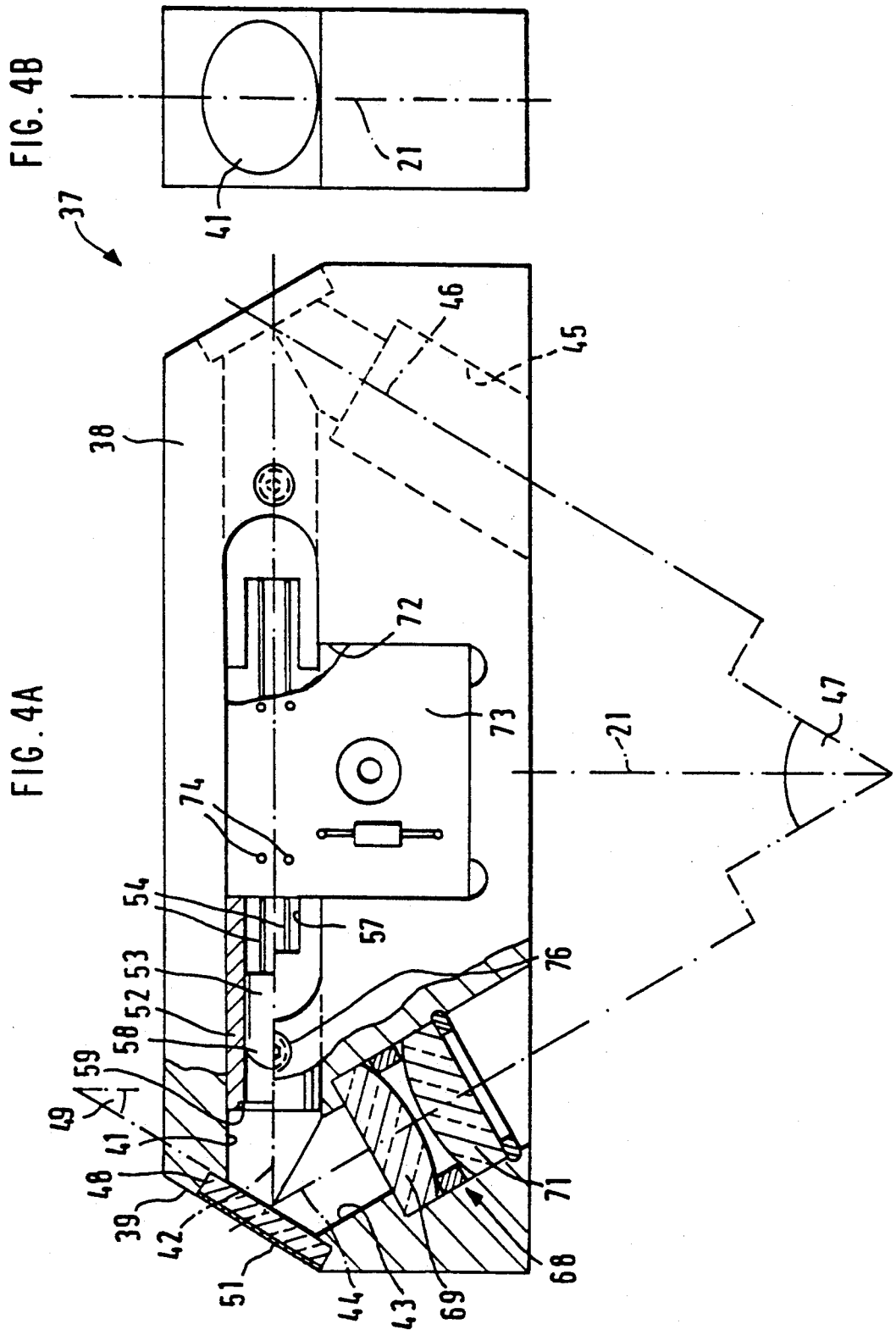

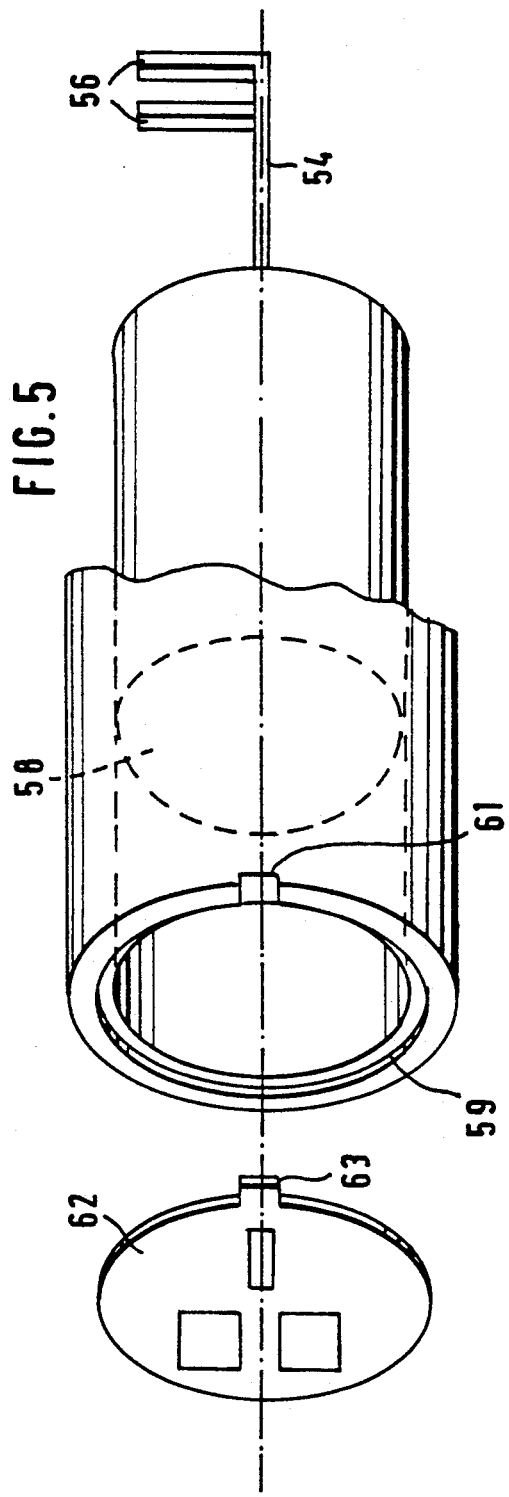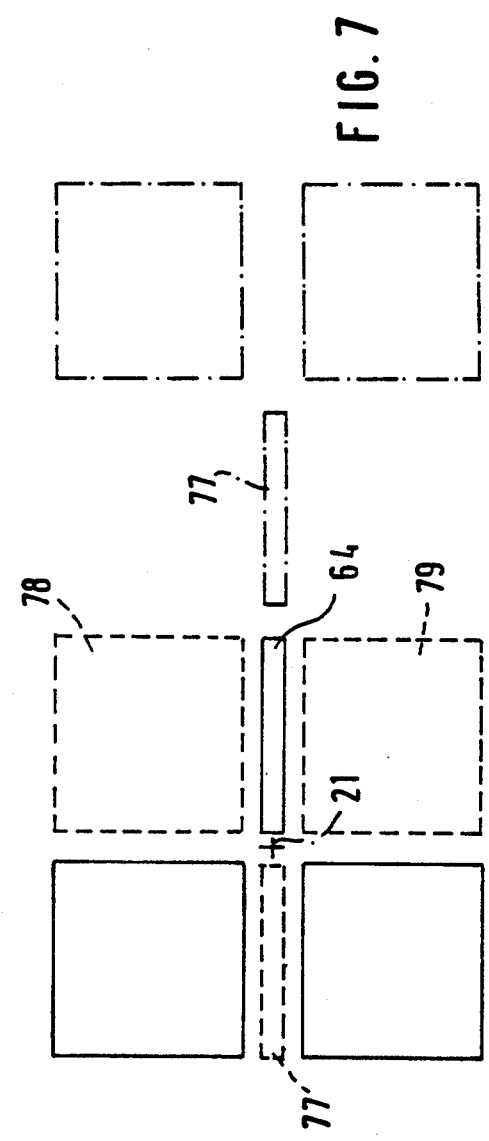

POSITIONING DEVICE FOR AN X-RAY THICKNESS MEASURING SYSTEM

The invention relates to a device for positioning a measurement object relative to an x-ray beam for measuring the thickness of thin layers in accordance with the backscatter principle.

BACKGROUND OF THE INVENTION AND RELEVANT PRIOR ART

Such measuring systems are known per se.

Such measuring systems include an x-ray tube for emitting x-rays along a first geometric longitudinal axis, a proportional counter tube for receiving radiation backscatterred from the measurement object, and a carrier for supporting the measurement object and for bringing the measurement object into the geometric longitudinal axis. See, for example, DE-PS 3,239,379. There are, however, also measuring systems which are larger in terms of size and which are fully encased for reasons associated with radiation protection. These then include, for example, the device according to FIG. 1 of the prior art in a relatively large container.

In this case, of course, the positioning of the measurement object on the carrier presents difficulties. In order to see from outside where the measurement object is situated, use has been made of expensive devices with very many complicated optical elements. For example, a camera has been used, which had a chip i.e. an image converter as used in video cameras, which is also known as a Charge Coupled Device (CCD), and the camera was connected by leads to a video viewing screen. In addition, some illuminating means were provided in the measurement space, so that it also became warm in the measurement region; this damages the proportional counter tube. Furthermore, the attempt to operate using cold light sources only shifts the problem, since these again involve an additional expenditure.

OBJECT AND STATEMENT OF THE INVENTION

The object of the invention is to provide a device with which it is possible to position the measurement object in a simple and inexpensive manner so that it is situated at the correct position in the x-ray beam in the course of the measurement.

According to the invention, this object is achieved by the following features:

The carrier is a tray, movable between a forward position for loading the measurement object and a rearward portion at the geometric longitudinal axis of the x-rays, and movable continuously up and down in the loading position, at least in the 1/10 mm range, An illuminating device is firmly connected above the tray, the illuminating device having a target spot that lies on the tray in front of the geometric longitudinal axis of the x-rays by a distance by which the tray can be moved to the forward position in a translational movement from the geometric longitudinal axis.

And, the target spot has a height position that corresponds to the height position of the spot at which the x-ray beam impinges the measurement object on the tray.

In this way, it is achieved that the measurement object is situated at the correct height and at the correct position, at which it is then later struck by the x-ray beam when the tray has been pushed in.

Additionally, the embodiment discloses the following advantageous features:

The illuminating device comprises a rigid unit having a light generator device that emits two light beams that intersect one another under an angle bisector along a second geometric longitudinal axis for the target spot, and a mask through which each of the light beams passes. Each of the masks has a marking, which markings enclose between them the target spot at the height of the measurement spot and are sharply imaged at the height of the target spot. These features provide a compact unit which does not vary and with which it is possible to position the measurement object correctly without the assistance of a further optical system or electronic system.

The light generator device comprises two light-emitting diodes that emit light beams anti-parallel and perpendicular to the geometric longitudinal axes. Each of the light beams includes first and second beam portions. The masks are situated in a first beam portion of each of the light beams. A deflector mirror follows each first beam portion and directs a second beam portion towards the target spot. And, a projection objective is situated following each mask.

Each first beam portion of said light beams are of equal length. Each second beam portion of the light beams are of equal length. And, the deflecting mirrors following each first beam portion are situated at equal, complementary angles to the geometric longitudinal axes. These features provide a symmetrical construction which simplifies the assembly, the operation, the production, the computation, etc.

The light-emitting diodes are situated in diode carriers, which are adjustably displaceable in the longitudinal direction of the first beam portion and carry one of the masks in front of each of the light-emitting diodes. By these features, the light-emitting diodes are both retained and also made easily settable, and the masks are located at an optically favorable position.

A mask is situated in each of the light beams and a projection objective is situated in each of the light beams behind each of the masks. As a result of these features, it is a simple matter to image the mask sharply in the region of the target spot.

A deflecting mirror is situated in front of each of the projection objectives. By this feature, the projection objective is placed at an optically particularly favorable position, which is also mechanically favorable.

The markings are narrow stripes. This gives a very precise indication of where the x-ray beam will impinge later.

Associated with each of the two light beams, two fields of illumination are provided in each of the masks opposite each of the markings, which fields of illumination exhibit substantially more area than each of the markings and leave between them space required for the marking of the mask of the other of the two light beams. By these features, it is indeed possible on the one hand to make the markings narrow but then there is indeed still sufficient general light in order to see how and where the measurement object is situated.

The diode carriers comprise small tubes in which the light-emitting diodes are mounted and have end regions in which the masks are mounted. By these features, it is possible to contain light-emitting diodes and masks into a unit which is movable together in the course of the adjustment.

Each of the masks has a positioning aid, and each of the small tubes has a counterpart in which the positioning aid fits. By these features, no mask is incorrectly inserted by mistake in the course of assembly.

The light-emitting diodes include a lens directing their light approximately parallel. By this feature, the field of illumination becomes and the markings become brighter, and moreover the projection objective can then also be designed in a simpler manner.

DESCRIPTION OF THE DRAWINGS

The invention is now explained with reference to a preferred illustrative embodiment. In the drawing:

FIG. 4A shows a shows a partially broken-away front elevation of an illuminating device, FIG. 4B shows a side elevation of an illuminating device shown in FIG. 4A, FIG. 5 shows a partially exploded, partially broken-away representation of individual parts shown in FIG. 4, FIG. 7 shows the representation of markings and fields of illumination in the case of incorrect and in the case of correct height position.

DESCRIPTION OF A PREFERRED EMBODIMENT

Figure 1:
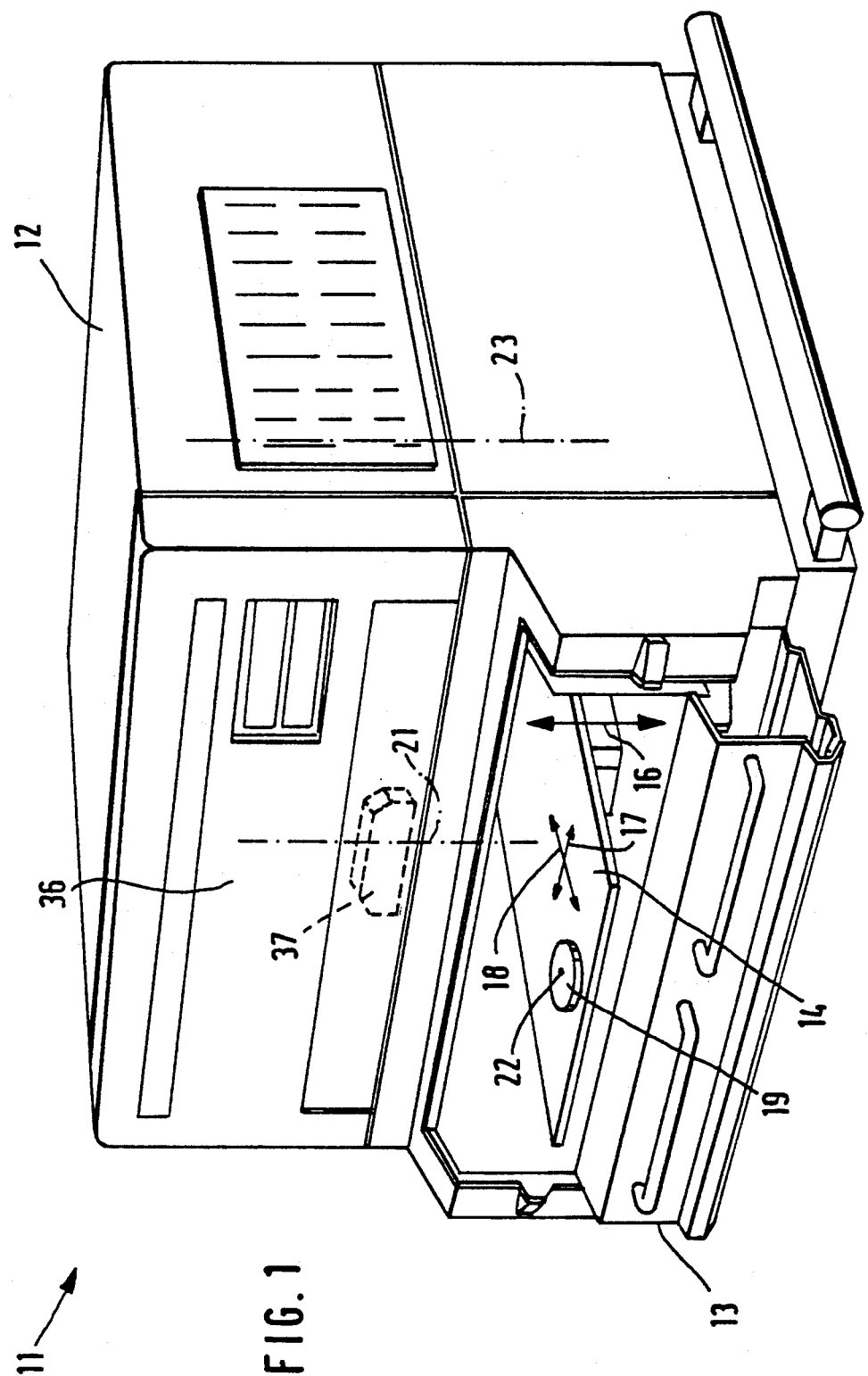
FIG. 1 shows a perspective view of a measuring system in which the invention is implemented.
Figure 2:
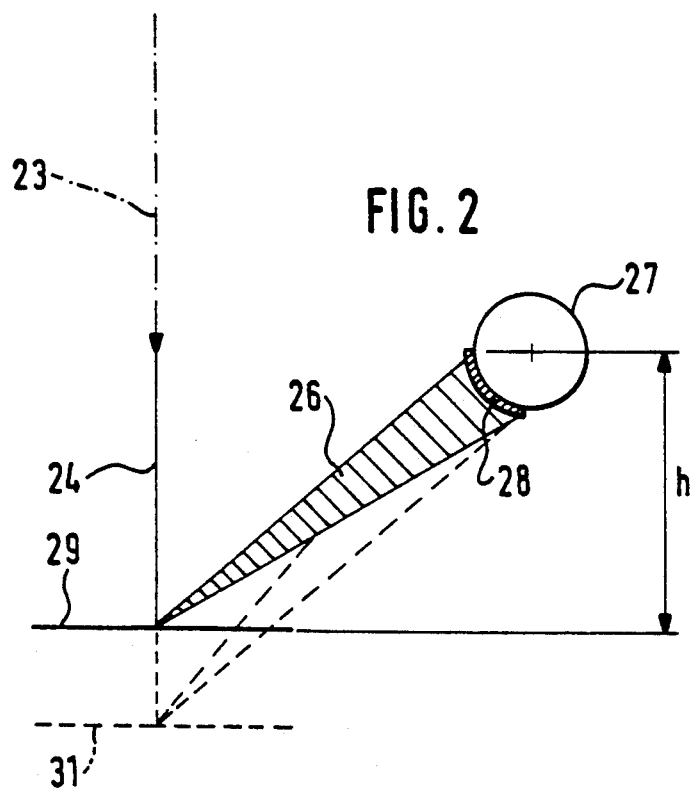
FIG. 2 shows a diagrammatic representation of the x-ray beam, of the backscatterred radiation and of the proportional counter tube.
Figure 3:
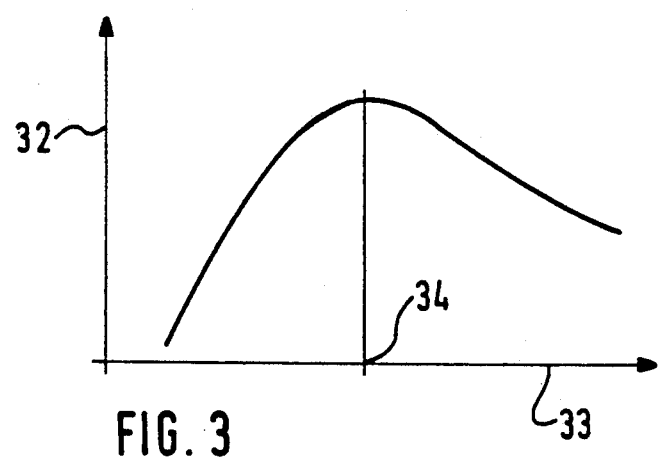
FIG. 3 shows a graph of the intensity received by the counter tube, as a function of the height of the carrier, or of the measurement object.
Figure 6:
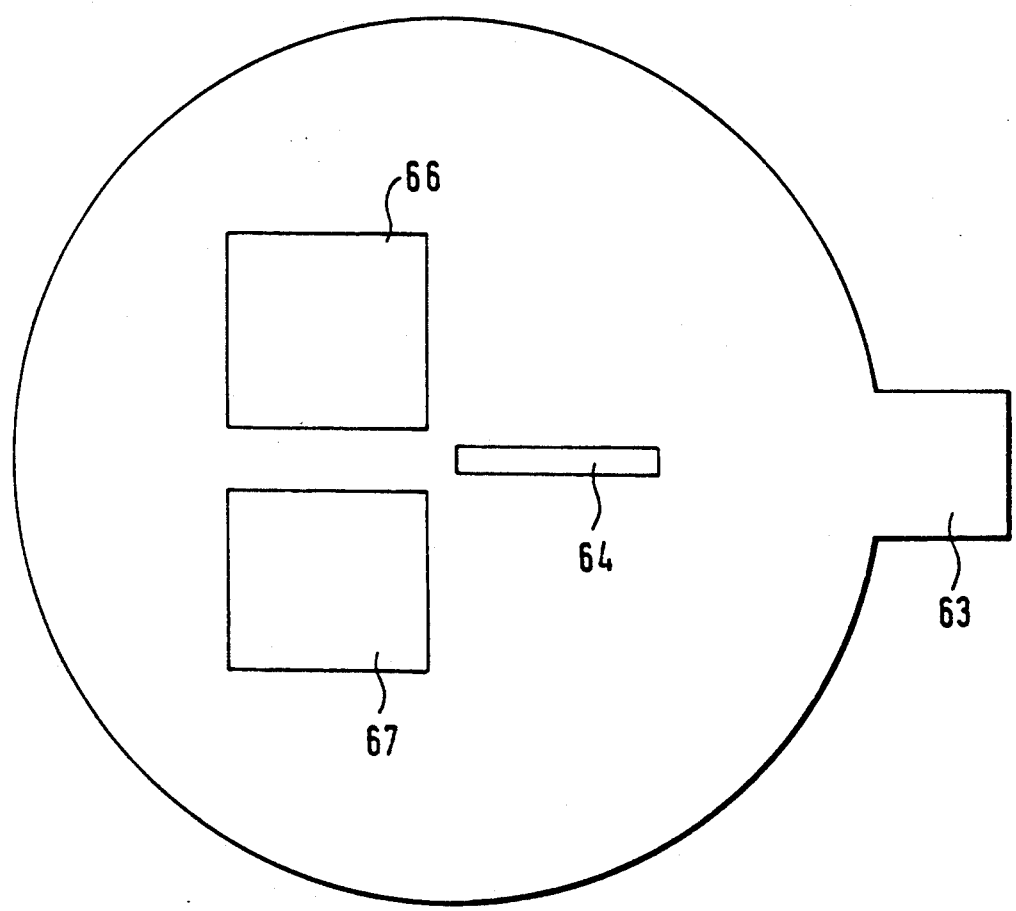
FIG. 6 shows the plan view onto a mask.

A measuring system 11 has a casing 12 which does not transmit x-rays. An openable flap 13 is provided on the operator's side. Within the measuring system 11 there is provided a tray 14 which is movable, in a manner not shown, with a coordinate control in the upward/downward direction 16, in the two lateral directions 17 and in the inward/outward directions 18. A measurement object 19 can be placed on the tray 14, the layer of which is to be measured. If the measurement object 19 is situated at the correct height and lateral direction 17 as well as inward/outward direction 18 correctly below a geometric longitudinal axis 21, then by the closing movement of the flap 13 the tray 14 may be run through precisely that path and with a purely translational movement without lateral movement or upward/downward movement, into the measuring system 11. Thus, a measurement spot 22, which was previously intersected by the geometric longitudinal axis 21, comes located precisely below a geometric longitudinal axis 23, which is parallel to the geometric longitudinal axis 21 and precisely in alignment with the inward/outward direction. According to FIG. 2, the geometric longitudinal axis 23 defines the path of an X-ray beam 24, which is generated by an X-ray tube (not shown) in the conventional manner and which then impinges upon the measurement spot 22. From the measurement spot, secondary rays are backscattered, a lobe 26 of which is received by a proportionally operating counter tube 27 through its beryllium window 28. As is conventional, the counter tube 27 is disposed laterally from the geometric longitudinal axis 23. In order to be able to measure in an intensity maximum using the counter tube 27, the height of the measurement spot 22 must be precisely maintained. If, according to FIG. 2, there is a height 29, then this gives a different backscatter geometry, as compared with the height 31. Height errors of, for example, on tenth of a millimeter are still good. In this case, FIG. 3 shows the qualitative interrelationships. The axis 32 shows the intensity of the backscattered radiation, which is received by the counter tube 27, and the axis 33 indicates the height 29. It is seen that there is an optimal height 34 at which the sensitivity is greatest and, according to the invention, the intention is to operate there. It would be desirable if in the run-out condition of the tray 14, the measurement spot 22 can be positioned so that in the run-in condition of the tray 14, the measurement spot is situated at the optimal height and is situated correctly in the lateral directions as well as in the outward/inward directions.

To this end, an illuminating device 37 is provided in the front region 36 which is accessible to the eye of the observer. It comprises an aluminum block 38 which is resistant to bending. A throughbore 41 is machined into the latter from its oblique surface 39, the geometric longitudinal axis 42 of which throughbore stands perpendicular to the geometric longitudinal axis 21. In the two end regions of the aluminum block 38, there are respectively machined two obliquely downwardly and inwardly pointing throughbores, 41, 43, the geometric longitudinal axes 44, 46 of which intersect one another at the bottom at an angle 47 of 60° the target spot, the angle bisector of which is the geometric longitudinal axis 21, to which they are then inclined at 30° in each instance. In FIG. 4 on the left, a mounting step 48 is provided in the region of intersection of the throughbores 41, 43, which mounting step is inclined to the geometric longitudinal axis 21 at an angle 49 of 60° and perpendicular to the plane of the drawing in FIG. 4. A plane mirror 51 is inserted therein from outside. In the left-hand half of the throughbore 41 there is situated a small tube 52 which is constructed of aluminum and which is displaceable with slight play in the throughbore. It holds, immovably in relation to it, a light-emitting diode 53, the two connecting wires 54 of which run to the right and show at the end with a respective bend 56, show out from the small tube and are also partially visible on account of a slot 57, which has an open edge to the right, in the side situated upwards in FIG. 4, in the small tube 52. The light-emitting diode 53 has, integrally on the left, a lens 58 which directs the light emanating from it parallel to the geometric longitudinal axis 42.

At the left-hand end of the small tube 52 there is provided a mounting rim 59, which consists of an inwardly turned step. A notch 61 is provided at three o'clock in the stationary wall according to FIG. 5. The mounting rim 59 mounts a circular-disk-shaped mask 62, the projection 63 of which sits in the notch 61 and thus ensures that the mask 62 always sits correctly in terms of angle in the mounting rim 59. The mask 62 is a film, which, apart from a narrow stripe 64 and two fields of illumination 66, 67, does not transmit the light of the light-emitting diode 53 which emits red light. Thus, the first beam section passes from the light-emitting diode through the mask 62 to reach the plane mirror 51.

Coaxially with the geometric longitudinal axis 44, which at the same time can also be regarded as the emergent axis for the geometric longitudinal axis 42 to be regarded as incident axis, there is inserted in the throughbore 43 a projection objective 68, consisting of two planoconvex lenses 69, 71. Their convex surfaces are according to the drawing, turned towards one another.

A rectangular depression 72 is sunk in the central region of the aluminum block 38. In this depression sits a printed circuit board 73, which carries the power supply circuit for the light-emitting diode 53. The bends 56 are soldered in there with solder points 74. From the side at the top according to FIG. 4, a grub screw 76 is screwed in, pointing vertically downwards and to the geometric longitudinal axis 42, the inner end of which grub screw rests with pressure on the external surface of the small tube 52 and thus arrests the latter against longitudinal displacement, once it has been correctly adjusted. The group screw 76 does not cause any rotational force with respect to the small tube 52.

Apart from the components on the printed circuit board 73, the illuminating device 37 to the right of the geometric longitudinal axis 21 is constructed in the same ways as on the left, so that, in view of the precise description of the left-hand side, a description of the right-hand side is superfluous.

In the operation of the measuring system 11, the flap 13 is opened; this, directly or indirectly, permits the tray 14 to be run out. The measurement object 19 is now placed manually below the longitudinal axis 21 so that as far as possible the measurement spot 22 is situated from the outset at the place where it will later be situated below the geometric longitudinal axis 23. A stripe 64 is then already seen, in the form of a narrow red bar of illumination on the measurement object 19. However, there is also already seen a stripe 77 of the right-hand system of the illuminating device 37, e.g. in a position shown in dot-dashed lines according to FIG. 7. The tray 4 is now lowered or raised until such time as the stripe 77 has the position shown in dashed lines. The geometric longitudinal axis 21 then passes through the point shown in FIG. 7, about which point the measurement spot 22 is also situated, and which point is then struck by the X-ray beam 24 when the tray 14 has been run in. In the position shown in FIG. 7 in solid lines and dashed lines, the stripes 64, 77 are sharp. Since the stripes 64, 77 are as long as the fields of illumination 66, 67, 78, 79, this position of alignment also serves as positioning aid. Moreover, it is recognized that the fields of illumination 66, 67, 78, 79 serve for a general brightening, so that all is not dark around the stripes 64, 77, which is also unfavorable in terms of the physiology of vision. The flap 13 is now closed, the tray 14 runs in a purely translational movement in a rearward direction, the measurement spot 22 is intersected by the geometric longitudinal axis 23, and the measurement can commence.

I claim:

1. A measuring system having a device for positioning a measurement object relative to an x-ray beam for measuring the thickness of thin layers in accordance with the backscatter principle, comprising:
   an x-ray tube for emitting x-rays along a first geometric longitudinal axis,
   a proportional counter tube for receiving radiation backscatterred from said measurement object, and
   a carrier for supporting said measurement object and for bringing said measurement object into said geometric longitudinal axis, wherein
   a) said carrier is a tray, movable between a forward position for loading said measurement object and a rearward position at said first geometric longitudinal axis, and movable continuously up and down in said loading position at least in the 1/10 mm range,
   b) an illuminating device is supported in a fixed position by said measurement system above said tray, said illuminating device projecting focused light to a target spot that lies in front of said geometric longitudinal axis by a distance by which said tray can be moved to said forward position in a translational movement from said first geometric longitudinal axis, and
   c) said target spot has a height position that corresponds to the optimal height position of the spot at which said x-ray beam impinges said measurement object on said tray.

2. A measuring system having a device for positioning a measurement object relative to an x-ray beam for measuring the thickness of thin layers in accordance with the backscatter principle, comprising:
   an x-ray tube for emitting x-rays along a first geometric longitudinal axis,
   a proportional counter tube for receiving radiation backscatterred from said measurement object, and
   a carrier for supporting said measurement object and for bringing said measurement object into said geometric longitudinal axis, wherein
   a) said carrier is a tray, movable between a forward position for loading said measurement object and a rearward position at said first geometric longitudinal axis, and movable continuously up and down in said loading position at least in the 1/10 mm range,
   b) an illuminating device is supported in a fixed position by said measurement system above said tray, said illuminating device projecting focused light to a target spot that lies in front of said geometric longitudinal axis by a distance by which said tray can be moved to said forward position in a translational movement from said first geometric longitudinal axis,
   c) said target spot has a height position that corresponds to the optimal height position of the spot at which said x-ray beam impinges said measurement object on said tray, and
   d) said illuminating device comprises a bend-resistant unit having a light generator device that emits two light beams that intersect one another under an angle bisector along a second geometric longitudinal axis for said target spot and a mask through which each of said light beams passes; each of said masks has a marking, which markings enclose between them said target spot at the height of said target spot and are sharply imaged at the height of said target spot.

3. The system as claimed in claim 2, wherein associated with each of said two light beams, two fields of illumination are provided in each of said masks opposite each of said markings, which fields of illumination exhibit substantially more area than each of said markings and leave between them space required for the marking of the mask of the other of said two light beams.

4. The system as claimed in claim 2, wherein said markings are narrow stripes.

5. The system as claimed in claim 2, wherein a mask is situated in each of said light beams, and a projection objective is situated in each of said light beams behind each of said masks.

6. The system as claimed in claim 5, wherein a deflecting mirror is situated in front of each of said projection objective.

7. The system as claimed in claim 2, wherein said light generator device comprises two light-emitting diodes that emit light beams antiparallel and perpendicular to said geometric longitudinal axes, each of said light beams include a first and a second beam portion, said masks are situated in said first beam portions, a deflector mirror follows each first beam portion and directs a second beam portion towards said target spot, and a projection objective is situated following each mask.

8. The system as claimed in claim 7, wherein said light-emitting diodes include a lens directing their light approximately parallel.

9. The system as claimed in claim 7, wherein each first beam portion of said light beams are of equal length,
each second beam portion of said light beams are of equal length, and said deflecting mirrors following each first beam portion are situated at equal, complementary angles to said geometric longitudinal axes.

10. The system as claimed in claim 9, comprising diode carriers in which said light-emitting diodes are situated, which diode carriers are adjustably displaceable in the longitudinal direction of said first beam portion and carry one of said masks in front of each of said light-emitting diodes.

11. The system as claimed in claim 7, comprising diode carriers in which said light-emitting diodes are situated, which diode carriers are adjustably displaceable in the longitudinal direction of said first beam portion and carry one of said masks in front of each of said light-emitting diodes.

12. The system as claimed in claim 11, wherein said diode carriers comprise small tubes in which said light-emitting diodes are mounted and have end regions in which said masks are mounted.

13. The system as claimed in claim 12, wherein each of said masks has a positioning aid, and each of said small tubes has a counterpart in which said positioning aid fits.

* * * * *